Sept. 21, 1965

E. C. WARRICK 3,206,860

APPARATUS FOR SETTING JOINTER OR LIKE ROTARY
HEAD MACHINE TOOL CUTTER BLADES AND METHOD
OF ADJUSTING SUCH BLADES

Filed May 27, 1960

INVENTOR
Edward C. Warrick

BY Strauch, Nolan & Neale

ATTORNEYS

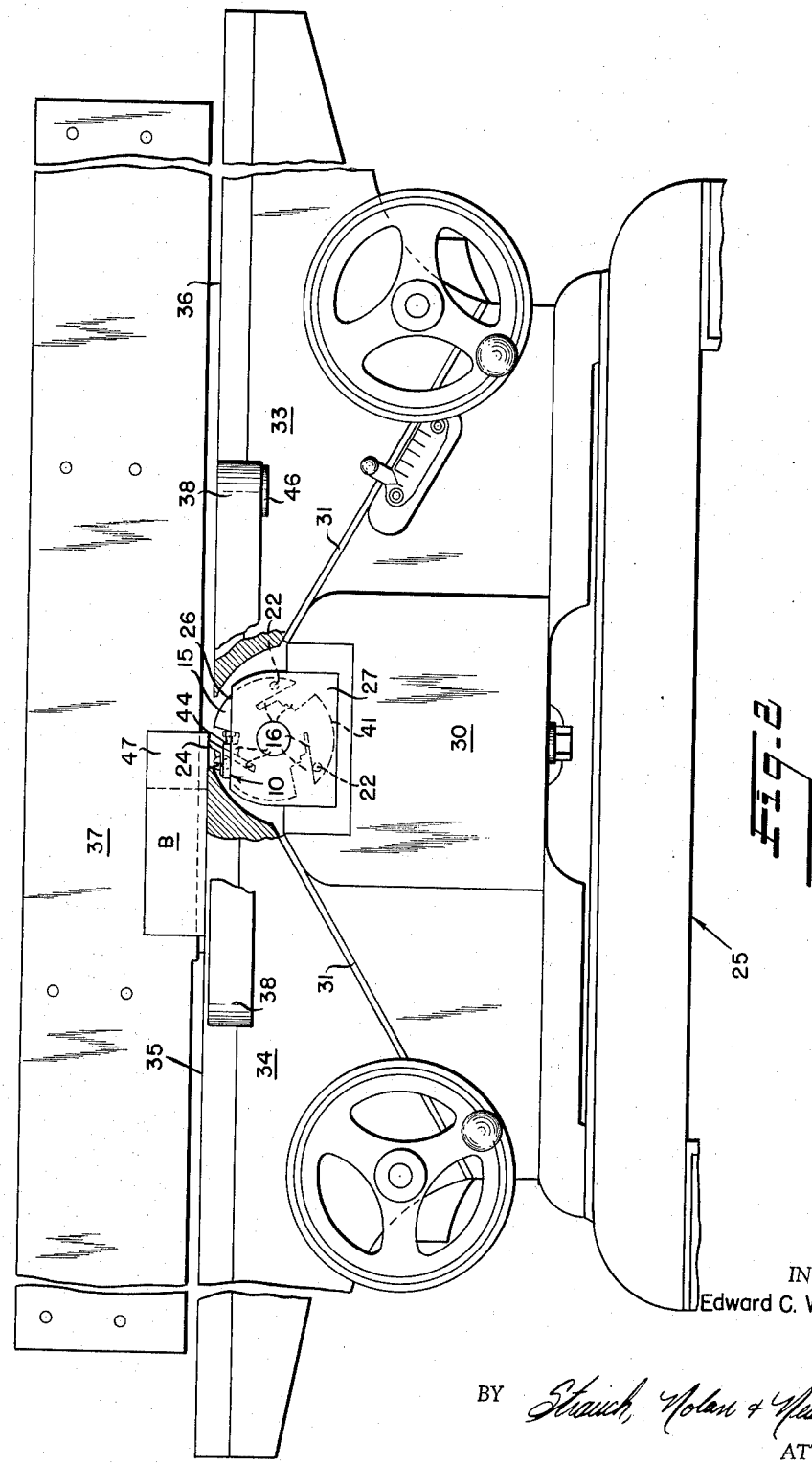

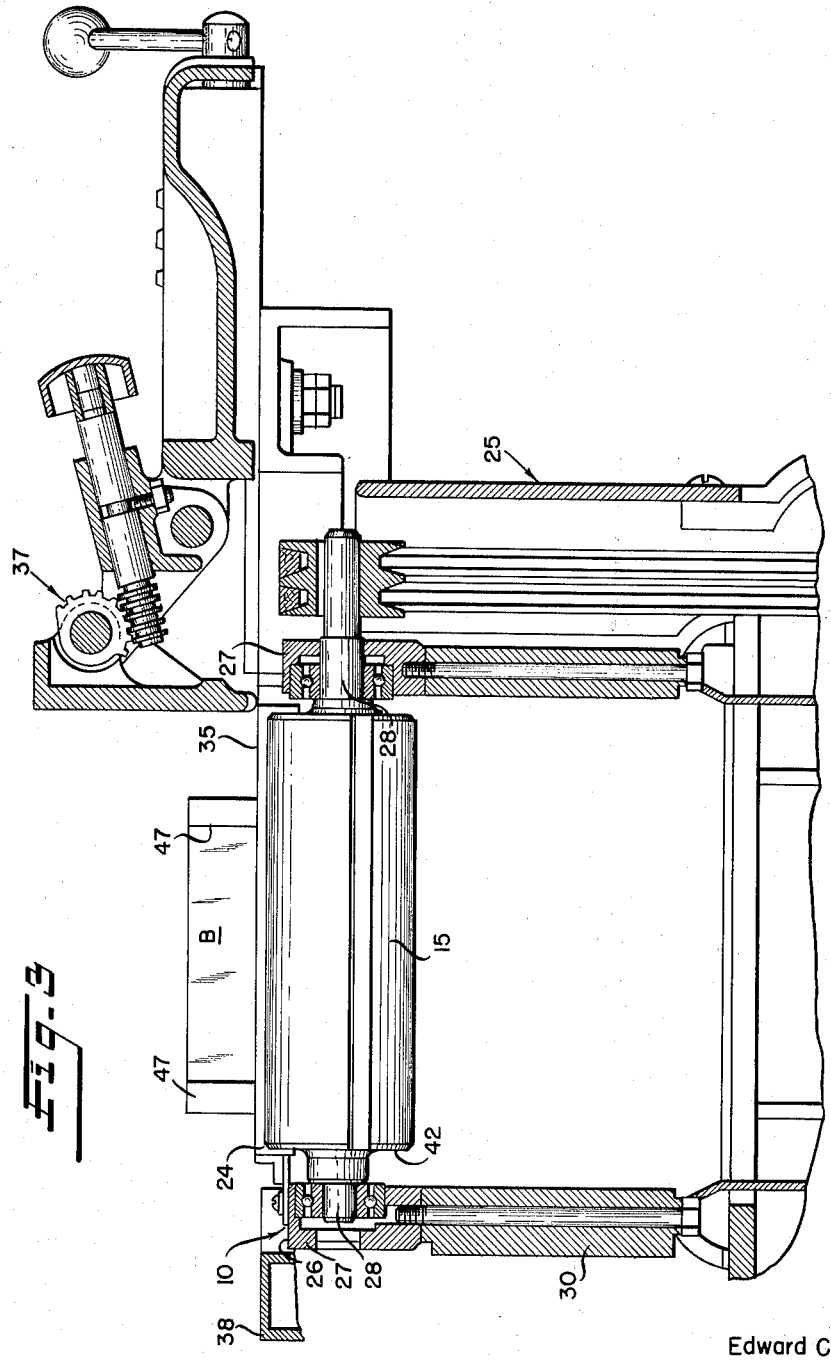

United States Patent Office 3,206,860
Patented Sept. 21, 1965

3,206,860
APPARATUS FOR SETTING JOINTER OR LIKE ROTARY HEAD MACHINE TOOL CUTTER BLADES AND METHOD OF ADJUSTING SUCH BLADES
Edward C. Warrick, Pittsburgh, Pa., assignor to Rockwell Manufacturing Company, Pittsburgh, Pa., a corporation of Pennsylvania
Filed May 27, 1960, Ser. No. 32,267
9 Claims. (Cl. 33—185)

The present invention relates to a method and means for accurately adjusting the radial and lateral position of the plural blades of a jointer, planer, or similar rotary head machine tool to equalize the cutting load and wear of the individual blades and to provide an accurate adjustment of at least one end of the respective blades to a plane normal to the cutter axis thereby insuring finish cutting of the vertical wall of a rabbeting cut in a workpiece.

In the past many proposals have been made for gages to provide a radial adjustment of the individual blades of a rotary cutter head tool but no one has suggested a simple inexpensive gage for gaging the lateral position of a blade alone or at the same time that the radial adjustment of the blade is effected so as to assure uniform blade wear from end to end of each blade and a neat finished cut of the vertical edge when a rabbeting cut is made. Examples of the prior gaging tools for radial blade adjustment are shown by United States Letters Patent 874,871 to Elmer S. Shimer, 1,668,431 to David A. Sprinkle, 2,343,309 to Nicholas P. Lloyd and 2,700,993 to William B. Pence.

It, accordingly, is the primary object of the present invention to provide a gage or indexing stop which will provide for an accurate lateral adjustment of the several blades of a rotary cutter head and at the same time lock the head in a predetermined angular position so the maximum permissible radial protrusion of the blade cutting edge from end to end can be provided.

Another important object of the present invention is to provide a simple and inexpensive gage or indexing stop for use inaccurately setting the cutter blades of jointer or like rotary cutter heads to equalize wear along the blades and between the respective blades and assure finish cutting of all workpiece surfaces.

Still another object of the present invention resides in the provision of a convenient and accurate method of adjusting the radial and relative axial positions of a plurality of cutters of a rotary cutter head to equalize wear along and between respective cutters and assure finish cutting of all workpiece surfaces.

Still other objects will appear from the following description and appended claims when read in conjunction with the accompanying drawings wherein FIGURE 1 is a top plan view of a jointer illustrating the indexing stop of the present invention applied to adjust the cutter head blades;

FIGURE 3 is a sectional view taken substantially on the line 3—3 of FIGURE 1 and looking in the direction of the arrows to show the cooperation between the indexing stop and a properly positioned blade;

FIGURE 5 is a perspective view of a modified indexing stop falling within the scope of the present invention.

Figure 1:
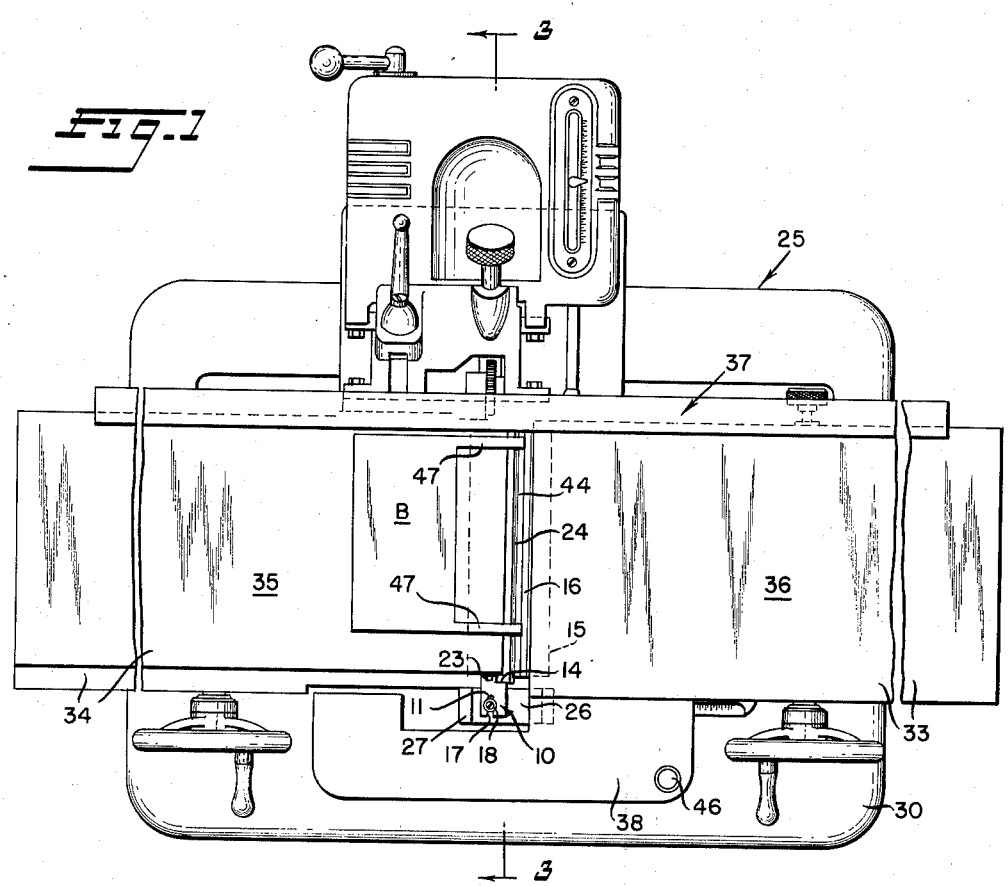

With continued reference to drawings wherein the same reference numerals are employed throughout the several views to indicate the same parts, the numeral 10 indicates the gage or indexing stop of the present invention. As best seen from FIGURES 2, 4 and 5, the gage is of plate-like form consisting of a main body portion 11 formed at one end with an axially protruding cutter head stop means in the form of a finger 12, an axially protruding first end portion or protrusion 13 adapted to abuttingly engage an end face of the cutter head body and a further axially facing blade gaging end portion 14 offset axially inwardly from end portion 13 to relate the respective adjacently related ends of the plurality of cutter blades in predetermined axial relation to the free end of end protrusion 13. While it is customary to have the cutter blade ends extend slightly beyond the opposite ends of the cutter head body in such mechanisms as the jointer cutter head 15 disclosed by the present application in illustrating the use of the present invention, it will be appreciated that the blade gaging end portion 14 could, if desired, be of a length to locate the blade ends exactly in the plane of the cutter head body end face or a predetermined distance inwardly from the body end face by suitable shaping and sloping of end portion 14 as shown in FIGURE 5 to protrude into the cutter head blade slots 16. The opposite end of the gage main body portion 11 is suitably slotted at 17 to freely receive a clamp bolt and washer assembly 18 (FIGURES 1 and 4) threaded into a tapped opening (not shown) in the journal bearing assembly for head 15 as will be presently pointed out. Also, if desired, the cutter head stop finger 12 might conceivably be replaced by a notch or recess 21 (FIGURE 5) if it should be feasible in a particular rotary cutter head usage to form the cutter head body end face with position determining lugs instead of the end face recesses 22 provided in the cutter head 15 as best seen from FIGURES 2 and 4. Preferably the point of confluence between finger 12 and the end protrusion 13 is undercut as illustrated at 23 to eliminate the filleted curvature that otherwise would exist at this point and assure a proper butting contact of end protrusion 13 with the cutter head body end face.

Figure 2:
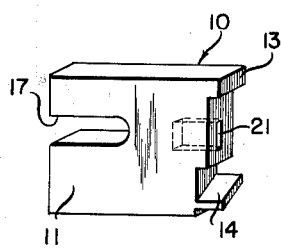
FIGURE 2 is a side elevational view of the jointer of FIGURE 1 showing an end view of the cutter head journal assembly carrying the indexing stop of the present invention and an end view of the cutter head and its blade slots.
Figure 4:
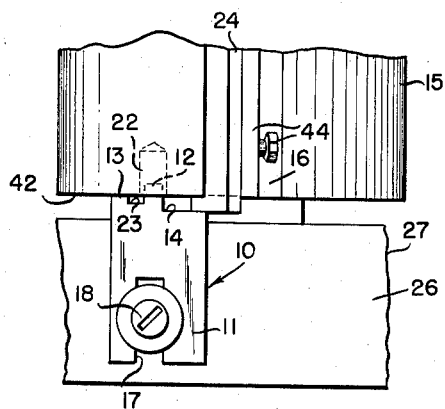
FIGURE 4 is an enlarged fragmentary view of the indexing stop secured in place on the journal bearing assembly and cooperating with the cutter head and cutter blade as shown in FIGURE 1.

As will be apparent from a consideration of the preceding description and FIGURES 1, 2 and 4 of the drawings in particular, the gage of the present invention is an extremely rugged and simple plate-like element that can be made of any suitable material, for example, metal, plastic, or wood of sufficient thickness to eliminate the possibility of inadvertent bending or breakage in normal use. Since the particular relative relationship of the respective blade ends to the cutter head body end face is not critical so long as each blade end is positioned in the same plane normal to the axis of cutter head rotation, it will be appreciated that no close tolerance need be maintained between the end faces of protrusion 13 and end portion 14.

In using the gage of the present invention to set the cutter blades 24 of a jointer 25 such as that illustrated in FIGURES 1, 2 and 3, the under or abutment face of main body portion 11 is shaped to matingly cooperate with the upper face 26 of the journal bearing assembly 27 provided to journal the protruding shaft ends 28 of the cutter head in customary fashion in the jointer art. Face 26 at one side of its center is suitably drilled and tapped to provide a tapped opening (not shown) for the clamp bolt of clamp bolt and washer assembly 18.

In this connection, a jointer of the type herein illustrated comprises a main support base 30 having oppositely downwardly inclined table mounting surfaces 31 extending away from centrally located rotary cutter head 15 journalled for rotation in laterally spaced journal bearing assemblies 27 disposed beyond the opposite side faces of independently vertically movable front and rear workpiece support tables 33 and 34. Table 34 is normally adjusted so its work support surface 35 lies in a plane tangent to the cylinder of revolution defined by the laterally extending cutting edges of the series of cutter blades 24 when properly radially adjusted (see FIGURE 2). Table 33 is normally adjusted so its work support surface 36 lies in a plane slightly below the tangent plane of rear table work support surface 35, the downward offset being sufficient only to determine the desired depth of cut. A work guide fence 37 is suitably supported for movement from one side of and laterally across tables 33 and 34 and cutter head 15, the fence in the present case and the general jointer structure being more fully shown and described in United States Letters Patent 2,758,617 and 2,804,107 of W. S. Taylor respectively issued August 14, 1956 and August 27, 1957. Table 33 at the side opposite that at which fence 37 is mounted carries a rabbeting arm 38 which projects laterally away from and rearwardly along tables 33 and 34 in vertically spaced relation to the adjacently related journal bearing assembly 27. As best seen in FIGURE 1, rabbeting arm 38 partially encircles the last mentioned journal bearing assembly leaving the upper flat face 26 exposed.

Face 26 as best seen in FIGURES 2 and 3, is spaced downwardly below the work support table surfaces 35 and 36 and a horizontal tangent plane containing the line of intersection of the periphery 41 (FIGURE 2) of cutter head body portion and a vertical plane containing the axis of rotation of cutter head 15. As a consequence, a substantial area of the upper half of head body end face 42 is accessible through the opening provided by rabbeting arm 38 as will be clear from an inspection of FIGURES 1 and 3 of the application drawings. The periphery 41 of cutter head body portion is provided with a plurality of axially directed cutter blade mounting slots 16 (FIGURE 2) the opposite ends of which extend through the body portion end face 42 as clearly appears from a consideration of FIGURES 2 and 4. Each slot 16 receives a respective elongated cutter blade 24, the blade of the uppermost slot 16 alone being shown in the application drawings. Each blade 24, as herein illustrated is of a length greater than the length of the respective slots 16. Blades 24 are releasably conventionally secured in radial and axial adjusted position in the respective slots 16 in any suitable manner, for example, by clamp screw and knife lock bar assemblies 44 which lie in the enlarged open side of slots 16. Since the particular manner of securing the blades in adjusted position forms no part of the present invention and is immaterial to the present invention so long as the blades are releasable for radial and axial adjustment, the details of the blade securing structure are not here described or illustrated. It is to be understood, however, that any cutter head and blade assembly providing for radial and axial blade adjustment and providing an exposed blade end may be adjusted in accordance with this invention by providing the cutter head body end face 42 with a stop formation adapted to matingly cooperate with the stop formation of the gage 10 of this invention to position the cutter head 15 so its blade cutting edge can be radially adjusted to lie tangent to the plane of work surface 35 when the blade is at its zenith.

In adjusting a jointer blade in accordance with this invention, the cutter head 15 is rotated manually to dispose an empty slot 16 facing upwardly between the adjacent ends of tables 33 and 34. The finger 12 of gage 10 is then inserted axially into the exposed head recess 22 and placed in position on upper face 26 of journal bearing assembly 27 with its slot 17 aligned with the tapped bolt opening in journal bearing assembly 27. Bolt and washer assembly 18 is then threaded home in the tapped bolt opening while gage 10 is pressed firmly in a direction to abut protrusion 13 with end face 42 of head 15. As a consequence, gage 10 is firmly drawn down into area contact with face 26 of journal bearing assembly 27 and finger 12 of gage 10, preferably formed to closely cooperate with the wall of recess 22, draws head 15 into its proper position to assure that a blade placed in the exposed slot 16 will be in its zenith position.

Then the fence 37 is moved to its extreme position at the side of the tables 33 and 34 remote from gage 10, the blade guard normally pivotally mounted in journal opening 46 of rabbeting arm 38 having been previously removed as illustrated herein, to expose the full length of slot 16. The table 34 is then set to a position such that its surface 35 lies in a plane spaced ½" above face 26 of the journal bearing assembly 27 and a blade 24 is introduced into the exposed slot 16 and moved axially to abut its end face opposed to gage 10 with end portion 14 of the gage. The knife lock bar and bolt assembly 44 is then introduced into slot 16, centered therein and the end bolts are backed out sufficiently to lightly retain the blade in place. A U-shaped block B having trued faces is then placed on rear table surface 35 with the legs 47 of the U overhanging cutter head 15 and abuttingly engaging the cutting edge of cutter blade 24, which is raised or lowered as required to permit the positioning of the legs 47. As will be clear from FIGURES 1 and 3, legs 47 engage blade 24 adjacent its opposite ends assuring lateral levelling of the cutting edge with respect to the table surfaces.

After checking the abutment of the blade end with gage end portion 14, the clamp bolts are all backed off to tightly clamp the blade in place while still radially positioned by the legs 47 of block B. The same procedure is then successively followed with respect to the remaining cutterhead blades 24. As a result all blades are individually adjusted to the same axial and radial reference points assuring that equal cuts into a workpiece will be made by the cutting edge of each blade and that the ends of the blades will rotate in a common plane assuring, in a rabbeting operation, that a clean, smooth wall surface at right angles to the bottom groove wall will result. In event the particular angular positioning of the cutter head does not result in the blade cutting edge being at its exact zenith when the adjustments are made, the necessary correction may be made by suitably raising the table 34 with the block B in position until the blades, with the head being rotated manually, brush lightly over the reference faces of the block legs 47.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A blade indexing stop for a rotary head machine tool having removable cutter blades positionable in head slots extending between the opposite body ends of a cutter head journalled beyond its body ends in respective journal bearing assemblies fixedly supported by a machine tool base comprising a member adapted to be adjustably secured in a fixed relation to a selected one of the journal bearing assemblies, a first portion adapted to abuttingly engage the cutter head body at its end adjacent said one bearing assembly, when said member is secured in place, cutter head positioning means adjacent said first portion adapted to cooperatingly engage said cutter head to position a respective slot so its associated cutter blade will lie in a particular plane and a blade gaging portion disposed adjacent said cutter head positioning means in a position to oppose an end of said respective head slot and be engaged by a cutter blade fitted in said respective head slot to thereby gage the relative axial position of said cutter blade with respect to said adjacent cutter head body end.

2. The blade indexing stop of claim 1 wherein said first portion is an end protrusion of relatively small area and separated from said cutter head positioning means by an inwardly offset end area to assure accurate abutting engagement between said first portion and the adjacent cutter head body end.

3. The blade indexing stop of claim 1 wherein said member has a body portion provided with a bolt slot elongated in a direction normal to the plane of abutment of said first portion adapting said blade indexing stop for adjustment relative to said one journal bearing assembly whereby said stop may be adjusted to cutter head body ends variously spaced from and angularly related to the one journal bearing assembly.

4. A blade indexing stop for a rotary head machine tool having removable cutter blades positionable in head slots extending between the opposite body ends of a cutter head journalled beyond its body ends in respective journal bearing assemblies fixedly supported by a machine tool base comprising a plate-like member adapted to be adjustably secured to a selected one of the journal bearing assemblies, a first end protrusion at one end of said member adapted to abuttingly engage the cutter head body at its end adjacent said one bearing assembly, when said member is adjustably secured in place, cutter head positioning means adjacent said first end protrusion adapted to cooperatingly engage said cutter head to position a respective slot so its associated cutter blade will lie in a particular radial plane and a blade gaging end portion disposed adjacent said cutter head positioning means in a position to oppose an end of said respective head slot and be engaged by a cutter blade fitted in said respective head slot to thereby gage the relative axial position of said cutter blade with respect to said adjacent cutter head body end.

5. The blade indexing stop of claim 4 wherein said cutter head positioning means comprises a protruding finger-like element.

6. The blade indexing stop of claim 4 wherein said cutter head positioning means comprises a recess opening through said one end of said member.

7. A rotary cutter head blade edge aligning gage comprising a unitary member having a first face adapted to engage an end face of a rotary cutter head; a second face spaced laterally of and parallel to said first face and adapted to have a releasably secured blade movable along an axis parallel to the axis of rotation of said cutter head abutted thereagainst; positioning means disposed between said first and second faces, said positioning means having parallel side walls disposed normal to said first and second faces, said positioning means being adapted to engage complementary positioning means on said end face of said rotary cutter head whereby said rotary cutter head may be accurately positioned in a desired angular relationship with respect to a vertical plane which includes the axis of rotation of said rotary cutter head; and gage fastening means so arranged as to permit adjustment of said gage toward and away from said rotary cutter head in a plane parallel to said axis of rotation.

8. A rotary cutter head blade edge aligning gage for accurately positioning an end edge of an axially adjustable blade of a rotary cutter head machine tool in a plane normal to the axis of rotation of said head comprising first abutment means having a face adapted to abut an end of said rotary cutter head, a second abutment means having a face parallel to and spaced from said first abutment means face against which an end edge of said axially movable blade may be abutted to determine the lateral positioning of the blade in the holder, and a third means extending normal to and beyond said faces of said first and second abutment means and adapted to engage cooperating means on said cutter head whereby said cutter head may be stationed with said axially adjustable blade in a predetermined position with respect to work surface means adjacent thereto.

9. The combination of a rotary cutter head machine tool having a plurality of axially movable blades and a blade edge aligning gage for aligning the end edges of said blades in a common predetermined plane normal to the axis of rotation of said cutter head, said aligning gage including a first face parallel to and engageable with an end of said cutter head, a second face parallel to and spaced from said first face, and a stop indexing portion normal to and extending beyond said faces, said portion being engageable with cooperating means on said cutter head to lock said head in a series of predetermined positions whereby the end edge of said blades may be abutted against said second face while said first face is engaged with said cutter head.

References Cited by the Examiner

UNITED STATES PATENTS

| 591,342 | 10/97 | Brown | 33—185 |
|---|---|---|---|
| 811,768 | 2/06 | Forbes | 144—230 X |
| 852,339 | 4/07 | Minnery | 144—130 X |
| 871,053 | 11/07 | Winningham | 33—185 |
| 1,089,654 | 3/14 | Loveland | 144—114 |
| 1,566,083 | 12/25 | Forslund | 33—180 |
| 1,668,431 | 5/28 | Sprinkle | 33—185 X |
| 2,496,800 | 2/50 | Larkins | 33—185 X |
| 2,589,865 | 3/52 | Rivard | 33—185 |
| 2,700,827 | 2/55 | Rowe et al. | 33—185 |
| 2,700,993 | 2/55 | Pence | 144—114 |
| 2,792,036 | 5/57 | Buttke | 144—230 X |
| 2,827,711 | 3/58 | Elschlager | 33—185 |
| 2,886,895 | 5/59 | Kushion | 33—185 |

FOREIGN PATENTS 2,965   1905   Great Britain.

ISAAC LISANN, *Primary Examiner.*

M. M. FRITZ, SAMUEL ROTHBERG, ROBERT L. EVANS, *Examiners.*